United States Patent [19]

Bergeron et al.

[11] 3,883,645

[45] May 13, 1975

[54] PREPARATION OF BERYLLIUM HYDRIDE

[75] Inventors: Charles R. Bergeron, Baton Rouge; Ralph W. Baker, Greenwall Springs, both of La.

[73] Assignee: Ethyl Corporation, Richmond, Va.

[22] Filed: Dec. 8, 1967

[21] Appl. No.: 690,712

Related U.S. Application Data

[63] Continuation-in-part of Ser. No. 365,232, April 30, 1964, abandoned.

[52] U.S. Cl. .............................. 423/645; 149/109
[51] Int. Cl. .............................................. C01b 6/00
[58] Field of Search ............... 23/204, 360; 423/645

[56] References Cited
OTHER PUBLICATIONS

Coates et al., Di-Tert-Butyl Beryllium and Beryllium Hydride, J.C.S., 2526–9, 1954.

Head et al., Di-T-Butyl Beryllium and Beryllium Hydride, J.A.C.S., 79, 3,687–9, 1957.

*Primary Examiner*—Leland A. Sebastian
*Attorney, Agent, or Firm*—Donald L. Johnson; John F. Sieberth; Lewis Hess

[57] ABSTRACT

Beryllium hydride of high bulk density, suitable for use as a component of high-energy fuels, is prepared by the pyrolysis, in solution in an inert solvent, of a di-tertiary-alkyl beryllium. An agitator introduces mechanical energy into the reaction system, during the pyrolysis, at the rate of 0.002–0.30 horsepower per gallon of reaction mixture.

14 Claims, No Drawings

PREPARATION OF BERYLLIUM HYDRIDE

This application is a continuation-in-part of application Ser. No. 365,232, filed Apr. 30, 1964, now abandoned. It relates to the provision of a novel and improved method for the preparation of beryllium hydride.

Beryllium hydride has been synthesized by Head, Holley and Rabideau [J. Am. Chem. 79, 3687 (1957)] using ether-free di-tert-butyl beryllium and by Hellman and Mears (National Bureau of Standards, private communication). The latter investigators heated the di-tert-butyl beryllium etherate to about 120°C. under 60 mm pressure of nitrogen and these conditions were maintained for about 4 days until the compound became jelly-like. At this point the pressure was lowered to the limit of the pump and the temperature raised to 200°C. over a period of about 2.5 hours and held there for an additional 1.5 hours. The flask was then cooled to 110° to 120°C. and pumping was continued for seven days. The product was a white porous mass which could be easily broken into a powder. Coates and Glockling [J. Chem. Soc. (London), 1954, 2526-29], working at a somewhat higher temperature than Hellman and Mears, obtained a similar product, which was shown by analysis to contain 68 weight percent of beryllium hydride.

The foregoing methods suffered from the difficulties of providing adequate heat transfer and ready removal of ether and its cleavage products from the highly immobile foam which is the primary product of these methods. As a result of these difficulties, these methods yielded beryllium hydride having a maximum purity of about 80 percent by weight.

One method of operation which largely overcomes the foregoing difficulties is disclosed in copending application, Serial No. 176,865, filed February 26, 1962. This method consists essentially in the pyrolysis, in solution in an inert solvent — preferably a high-boiling aliphatic hydrocarbon such as cetane — of a di-tert-alkyl beryllium etherate wherein each of the tertiary alkyl radicals contains from 4 to 20 carbon atoms. This process results in the precipitation from the solution of a product from which beryllium hydride can readily be recovered in a purity of approximately 90 percent by weight.

While the above method is superior to those of the earlier investigators in that the recovery operation is easier to carry out and leads to a product of higher purity, its purity and the purity of the beryllium metal obtained by the thermal decomposition thereof are still inadequate for certain applications. Accordingly it is an object of the present invention to provide a method of preparing beryllium hydride which is not subject to the aforementioned difficulties.

Another object of this invention is to provide a method for preparing beryllium hydride in high yield and in an easily recoverable form.

Still another object of this invention is to provide a method for preparing beryllium hydride of a high degree of purity, suitable for use in the preparation of pure beryllium metal. Additional objects will appear hereinafter.

The process of the present invention comprises preparing beryllium hydride by the thermal decomposition, in solution in an inert solvent, of a dialkyl beryllium or of an etherate thereof wherein each of the alkyl radicals contains 4 to 20 carbon atoms, said thermal decomposition being accompanied during the course of the reaction by vigorous agitation of the reacting mixture. Another embodiment of the present invention is the formation of beryllium hydride by the pyrolysis of di-tert-butyl beryllium diethyl etherate in an inert solvent, with the application of vigorous agitation to the reacting mixture during the course of the reaction.

Still another embodiment of this invention is the preparation of beryllium hydride by the pyrolysis of di-tert-butyl beryllium diethyl etherate while in solution in an inert highboiling hydrocarbon solvent, said pyrolysis being accompanied by vigorous agitation of the reacting mixture during the course of the reaction. Still other embodiments will appear hereinafter.

An outstanding feature of this invention is that a new form of beryllium hydride is produced which is characterized by a bulk density (measured by weighing the product into a glass cylinder, tapping on the bottom of the cylinder until no further settling occurs, and reading the volume) ranging from about 0.24 to about 0.40 gram per cc, depending on the rate of input of mechanical energy to the reaction mixture. Thus, for inputs of mechanical energy in the range of 0.002 to 0.120 horsepower per gallon of reaction mixture, the bulk density of the product ranges from about 0.24 to about 0.29 gram per cc., generally about 0.26 gram per cc., whereas with mechanical energy inputs of 0.120 to 0.30 horsepower per gallon, the bulk density of the product ranges from about 0.30 to about 0.40 gram per cc., generally about 0.37 gram per cc. Mechanical energy inputs of 0.25 to 0.30 horsepower per gallon yield a superior product, and are therefore preferred.

This high bulk density is characteristic of the smooth, well-rounded, nodular form of the product particles (shown by microscopic examination) which results from nucleation and uniform growth of product particles owing to improved efficiency of contact of the beryllium alkyl reactant with the growing product particles. In this way, continuous nucleation is avoided. Instead, the particles grow to a relatively uniform size and shape. Furthermore, high shear tends to abrade the small, high-surface-area rough projections. This permits tighter packing of the particles.

The product has a generally uniform particle size, 86 percent of the particles having diameters in the range of 40–70 microns. A typical product has the following distribution:

| Diameter, $\mu$ | % Greater than |
| --- | --- |
| 20 | 100 |
| 30 | 100 |
| 40 | 93 |
| 50 | 57 |
| 60 | 19 |
| 70 | 7 |
| 80 | 3 |
| 90 | 1 |

The product is also characterized by higher purities than those previously obtained. Products analyzing 93–96 percent beryllium hydride are readily prepared, and purities of 98 percent can be obtained under favorable conditions.

The high bulk density is significant in several areas of use. Of first importance is the fact that it permits high weight percent beryllium hydride loadings in propellant mixtures. The high-bulk-density material, when subjected to a post-treatment such as grinding, produces particles having desirable size and shape distributions, thus permitting high loadings and ready blending or mixing with other propellant ingredients. Furthermore, it yields valuable shipping and storage advantages since the space requirement for a given weight of the product is reduced as compared with the requirement for previously known forms of beryllium hydride. Moreover, when the product is used as a source of hydrogen, a greater volume of gas is obtained from a given volume of the compound of this invention than from the same volume of any of the previously known forms of the compound.

In the above-mentioned areas of high loadings and ease of blending, the beryllium hydride materials hitherto described are highly unsatisfactory. The propellant mixes derived from them are extremely viscous and do not permit proper blending of the propellant ingredients. Furthermore, these viscous blends do not pour satisfactorily: the resulting cast propellant contains numerous and extensive voids which, in turn, drastically and unfavorably affect the burning characteristics of the propellant grain. Because of these interrelated problems, the beryllium hydride materials known heretofore can be used only at low loadings in propellant mixes. The resulting propellants, consequently, have maximum specific impulse ratings far below the desired target value of 280 seconds, and are therefore completely unsatisfactory for rocketry applications. Propellant blends made from the high-purity, nodular product of the present invention, on the other hand, have specific impulses in the range of 280 seconds and above and are therefore of great importance and utility as rocket fuels. The latter specific impulses are higher than any heretofore reported.

The invention will be more fully understood by reference to the following illustrative examples, in which all parts and percentages are by volume, unless otherwise specified.

EXAMPLE I

The reactor was a 3-neck flask outfitted with a high-speed stirrer, a reflux condenser and a dropping funnel. The condenser outlet was vented to a bubbler which served as a seal against air. Dry nitrogen was used to purge the equipment of air and moisture and to maintain a slight positive pressure as needed.

100 Parts of dodecane were charged to the reactor, and the stirrer was then set in motion, mechanical energy being supplied to the reacting mixture at the rate of about 0.05 horsepower per gallon of mixture. The reactor was then heated by means of a heating mantle. When the solvent reached a temperature of 197°–200°C., addition of 25 parts of di-tert-butyl beryllium diethyl etherate was begun and the stirrer speed was increased until the power input amounted to about 0.1 horsepower per gallon of mixture. The rate of addition was limited primarily by the rate at which heat could be introduced into the reaction mass. When the addition was completed (in about 15 minutes) the gas evolution dropped off quite rapidly and was essentially complete after an additional 5 to 10 minutes. The stirrer was stopped and the hot slurry was filtered immediately thereafter. The filter cake was washed with 200 parts of dry petroleum ether added portionwise and then dried by applying a vacuum of less than 0.001 millimeter at 100°C. for a period of 1 hour. The product was snow-white and had a somewhat grainy appearance, an absolute density of 0.65 gram per cc. and a bulk density of 0.21 gram per cc. The purity was 92.6 percent by weight as beryllium hydride.

When the above experiment was repeated, using diisobutyl beryllium diethyl etherate in place of di-tert-butyl beryllium diethyl etherate, similar results were obtained. Results similar to the above were also obtained when Example I was repeated using ether-free di-tert-butyl beryllium in place of di-tert-butyl beryllium diethyl etherate.

The procedures employed in the following experiments were similar to that used in Example I, except that the power input to the agitator was measured in each case. The reaction conditions and experimental results are summarized in Table I below.

TABLE I

Pyrolysis of Di-Tert-Butyl Beryllium Diethyletherate in Refined Kerosene (Solvent-Etherate Ratio = 4:1) under Nitrogen at Atmospheric Pressure

| Example | II | III | IV | V | VI | VII |
|---|---|---|---|---|---|---|
| Reaction Temp., °C. | 195–197 | 195–196 | 200–203 | 193 | 195–196 | 195–204 |
| Input to Agitator, HP/gal. | 0.120 | 0.120 | 0.120 | 0.056 | 0.088 | 0.095 |
| Feed Time, min. | 38 | 31 | 37 | 18 | 37 | 40 |
| Product Purity, wt. % $BeH_2$ | 89.8 | 90.6 | 87.8 | 93.8 | 92.2 | 96.9 |
| Bulk Density, g./cc. | 0.24 | 0.23 | 0.26 | 0.13 | 0.19 | 0.18 |
| Particle Size, microns | <50 | <50 | <50 | <70 | — | <50 |

EXAMPLE VIII

Using the procedure of Example I, bis(2-methyl-2-pentyl) beryllium dipropyl etherate is pyrolyzed at 190°–193°C. in 1,4-dimethylnaphthalene using a solvent:alkyl ratio of 3:1. The input to the agitator is 0.056 HP/gal. and the feed time is 42 minutes. An inert, protective atmosphere of helium is used at a pressure of 200 mm. The product is similar in appearance and properties to that obtained in Example I.

EXAMPLE IX

Proceeding as in Example I, bis(2-methyl-2-undecyl) beryllium diamyl etherate is subjected to pyrolysis at a temperature of 194°–197°C. Cetane is used as the solvent and the solvent:alkyl ratio is 5:1. Power is supplied to the agitator at the rate of 0.088 HP/gal. and the alkyl feed is complete after 10 minutes. Protection is provided by an atmosphere of argon at 120 mm. The product resembles that of Example I.

EXAMPLE X

Proceeding as above, the pyrolysis of bis(2-methyl-2-butyl) beryllium dimethyl etherate is carried out in n-decane at 198°–201°C., the solvent-alkyl ratio being 4:1. The power input is 0.095 HP/gal. and the alkyl is fed over a period of 29 minutes. The atmosphere is methane at 1750 mm pressure. The product is similar to that of Example I.

EXAMPLE XI

The reactor was a 50-gallon autoclave provided with baffles, a high-speed turbine agitator, a reflux condenser and input and output ports. The condenser outlet was vented to the atmosphere through a back pressure control valve.

Using the general procedure of Example I, di-tert-butyl beryllium diethyl etherate was pyrolyzed in kerosene ("Bayol 35") at about 200°C. and under a nitrogen pressure of 5 pounds per square inch gauge. During the reaction, the agitator was rotated at 710 rpm, corresponding to a power input of about 0.30 horse-power per gallon of reaction mixture.

The reactant feed period varied from 60 to 90 minutes, depending upon the particular reaction conditions. The feed period was followed by a "cook" period of 5 to 10 minutes at a temperature of 204°–205°C., to permit reaction of the last part of the feed.

The product was separated by filtration, washed five times with petroleum naphtha, and dried at about 100°C. under a reduced pressure of about 1 mm. of mercury. Analysis of the product gave the following results:

| | |
|---|---|
| $BeH_2$ | 96.1% by weight |
| Beryllium Alkyls | 1.7 |
| Be Metal | <1.0 |
| Beryllium Alkoxide | 0.11 |
| Beryllium Chloride | 0.07 |
| Volatiles | <0.01 |

The product had an absolute density of 0.65g/cc and a bulk density of 0.40g/cc.

A considerable variety of organoberyllium compounds can be used in the practice of the present invention. Included are all beryllium alkyls having in each radical 4 to 20 carbon atoms. Non-limiting examples of such compounds are bis(3-ethyl-3-hexyl)-beryllium, bis(2-methyl-2-heptyl)beryllium, bis(2-methyl-2-tridecyl)beryllium, bis(2-methyl-2-pentadecyl)beryllium, diisopentylberyllium, di-isodecylberyllium, bis-3-hexylberyllium, bis-5-dodecylberyllium and bis-7-octadecylberyllium. However, tertiary beryllium alkyls, such as di-tert-butyl beryllium are preferred because they decompose more smoothly and at lower temperatures than primary and secondary beryllium alkyls. The ether of the etherate may be diethyl ether, dibutyl ether, dihexyl ether or any similar ether containing not more than about 10 carbon atoms in each alkyl radical.

Among the criteria for the choice of solvents to be employed in the reaction of this invention are that the solvent be liquid under the reaction conditions and that it be inert to both reactants and products. Preferably, it should boil at about 5°–15°C. above the operating temperature, under the reaction conditions. Accordingly, the solvents may include aliphatic hydrocarbons such as n-nonane, 2,2,4-trimethyl hexane, n-decane, n-dodecane, n-tetradecane, n-cetane and mixtures thereof, such as kerosene, and the like; aromatic hydrocarbons such as toluene, orthoxylene, cumene, mesitylene, and the like; and mixtures of two or more of the foregoing. Of these hydrocarbon solvents, the preferred materials are saturated aliphatic hydrocarbons containing from about 10 to about 16 carbon atoms because they are inexpensive and readily available and because they are even more inert than the aromatic hydrocarbons. Dodecane and kerosene are particularly preferred because of their ready availability, and because their boiling points under the operating conditions fall within the preferred range mentioned above.

The reactions of this invention may be carried out at any temperature, sufficient to result in the formation of beryllium hydride, which is within the liquid range of the solvents under the pressures employed. In general, these temperatures fall in the range of 150° to 220°C. The precise temperature employed within this general range depends somewhat upon the identity of the particular dialkyl beryllium etherate undergoing reaction and to a lesser extent upon the solvent being used. However, as the temperature is reduced below 195°C. the purity of the product begins to fall off and, as it is raised above 205°C., thermal decomposition of the beryllium hydride begins; the preferred temperature range is therefore 195°c. to 205°C.

The reactions of this invention usually proceed at satisfactory rates under atmospheric pressure but pressures ranging from less than 50 mm of mercury to more than 10 atmospheres may be used if desired.

The solvent-alkyl ratios employed in the pyrolysis of dialkyl beryllium etherate in the hydrocarbon solvents may vary over the range of about 1.5:1 to about 5:1; ratios of 2:1 to 4:1 are preferred because at these ratios the reaction proceeds smoothly and at a satisfactory rate.

The reactions of the invention may be carried out under any atmosphere inert to both reactants and products. The use of dry nitrogen is preferred because of its availability and economy. Other suitable protective atmospheres include gaseous saturated hydrocarbons such as methane and ethane and the noble gases helium, neon, argon, krypton and xenon.

The power input to the agitator employed in the process of this invention may vary from less than 0.002 to more than 0.30 horsepower per gallon. However, the purity of the product varies markedly with the agitation rate. Best results are obtained with power inputs varying from 0.25 to 0.30 horsepower per gallon and this range is therefore preferred.

The beryllium hydride obtained by the process of this invention is, as indicated above, a valuable component of rocket fuels. It can be used for the metal plating of suitable substrates by thermal decomposition under suitable conditions in contact with said substrates. It is useful as a source (by thermal decomposition) of pure metallic beryllium for use in alloys or other chemical raw materials. Specifically, a series of beryllium-aluminum alloys has found use in supersonic aircraft, nuclear fuel canning, gyro cages, aircraft brakes, computer memory drums and discs and radiator sections for space vehicles. (See "Chemical and Engineering News," Sept. 9, 1963, page 41.)

We claim:

1. In a process for the preparation of beryllium hydride which comprises pyrolyzing, while in a solvent inert under the reaction conditions with respect to reactants and products and at a temperature in the range of from about 150° to about 220°C. sufficient to result in the formation of beryllium hydride, a compound selected from the group consisting of beryllium dialkyls and etherates thereof wherein each alkyl radical contains from 4 to 20 carbon atoms, the pyrolysis being carried out under an atmosphere inert under the reaction conditions with respect to reactants and products, the improvement which comprises agitating the reaction mixture during the course of the reaction in such manner as to introduce mechanical energy into the reaction mixture at the rate of from about 0.002 to about 0.30 horsepower per gallon of the said reaction mixture.

2. The process of claim 1 wherein the alkyl radical is a tertiary butyl radical.

3. The process of claim 1 wherein the etherate is a diethyl etherate.

4. The process of claim 1 wherein the inert solvent is a saturated aliphatic hydrocarbon containing from about 10 to about 16 carbon atoms.

5. The process of claim 1 wherein the inert solvent is n-dodecane.

6. The process of claim 1 wherein the inert solvent is kerosene.

7. The process of claim 1 wherein the inert atmosphere is dry nitrogen.

8. The process of claim 1 wherein the ratio of inert solvent to dialkyl beryllium etherate is from about 1.5:1 to about 5:1 by volume.

9. The process of claim 1 wherein the pyrolysis temperature is in the range of from about 195° to about 205°C.

10. The process of claim 1 wherein mechanical energy is introduced into the reaction mixture at the rate of from about 0.25 to about 0.30 horsepower per gallon of the said reaction mixture.

11. The process of claim 1 wherein said alkyl radical is a tertiary alkyl radical.

12. The process of claim 1 wherein said compound is an etherate.

13. The process of claim 1 wherein said compound is a di-tertiary butyl beryllium etherate and wherein mechanical energy is introduced into the reaction mixture at the rate of from about 0.25 to about 0.30 horsepower per gallon of the said reaction mixture.

14. The process of claim 1 wherein said compound is di-tertiary butyl beryllium diethyl etherate and wherein mechanical energy is introduced into the reaction mixture at the rate of from about 0.25 to about 0.30 horsepower per gallon of the said reaction mixture.

* * * * *